(12) United States Patent
Kuroha et al.

(10) Patent No.: US 10,164,271 B2
(45) Date of Patent: Dec. 25, 2018

(54) POLYMER ELECTROLYTE FUEL CELL WITH A RECESS IS FORMED DOWNSTREAM OF A GAS LEAD-OUT PORT

(71) Applicant: PANASONIC CORPORATION, Osaka (JP)

(72) Inventors: Tomohiro Kuroha, Osaka (JP); Shinsuke Takeguchi, Osaka (JP); Satoshi Otani, Osaka (JP); Yasushi Sugawara, Osaka (JP); Mitsuo Yoshimura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 752 days.

(21) Appl. No.: 14/364,034

(22) PCT Filed: Feb. 27, 2013

(86) PCT No.: PCT/JP2013/001161
§ 371 (c)(1),
(2) Date: Jun. 9, 2014

(87) PCT Pub. No.: WO2014/073123
PCT Pub. Date: May 15, 2014

(65) Prior Publication Data
US 2014/0356739 A1    Dec. 4, 2014

(30) Foreign Application Priority Data
Nov. 6, 2012  (JP) ................... 2012-244338

(51) Int. Cl.
*H01M 8/04*        (2016.01)
*H01M 8/04291*    (2016.01)
(Continued)

(52) U.S. Cl.
CPC ..... *H01M 8/04291* (2013.01); *H01M 8/0258* (2013.01); *H01M 8/0263* (2013.01);
(Continued)

(58) Field of Classification Search
CPC ......... H01M 8/04291; H01M 8/04119; H01M 8/04171; H01M 8/2483; H01M 8/2484;
(Continued)

(56) References Cited

U.S. PATENT DOCUMENTS

2003/0064266 A1    4/2003  Ogami et al.
2004/0247986 A1*  12/2004  Takeguchi .......... H01M 8/0258
                                                            429/457
(Continued)

FOREIGN PATENT DOCUMENTS

EP    2330668 A1      6/2011
JP    2000-090954 A   3/2000
(Continued)

OTHER PUBLICATIONS

English translation of Nakanishi, JP 2001-006715 A, submitted by the applicant, accessed on Dec. 9, 2016.*
(Continued)

*Primary Examiner* — Milton I Cano
*Assistant Examiner* — Philip A. Stuckey
(74) *Attorney, Agent, or Firm* — McDermott Will & Emery LLP

(57) ABSTRACT

A polymer electrolyte fuel cell according to the present invention includes: a unit cell including a membrane-electrode assembly and a pair of separators; a manifold; a gas introducing member; and a first member. A recess is formed at a gas lead-out port side of the gas introducing member so as to be connected to the gas lead-out port. The first member is provided such that a communication portion thereof communicates with the manifold. The gas introducing mem-
(Continued)

ber is provided such that: the recess communicates with the communication portion; and when viewed from a thickness direction of the polymer electrolyte membrane, the gas lead-out port and a main surface of the first member overlap each other.

11 Claims, 11 Drawing Sheets

(51) Int. Cl.
    *H01M 8/0273* (2016.01)
    *H01M 8/0263* (2016.01)
    *H01M 8/0267* (2016.01)
    *H01M 8/2483* (2016.01)
    *H01M 8/2484* (2016.01)
    *H01M 8/04119* (2016.01)
    *H01M 8/241* (2016.01)
    *H01M 8/242* (2016.01)
    *H01M 8/2485* (2016.01)
    *H01M 8/0258* (2016.01)
    *H01M 8/1018* (2016.01)

(52) U.S. Cl.
    CPC ....... *H01M 8/0267* (2013.01); *H01M 8/0273* (2013.01); *H01M 8/04119* (2013.01); *H01M 8/04171* (2013.01); *H01M 8/242* (2013.01); *H01M 8/2415* (2013.01); *H01M 8/2483* (2016.02); *H01M 8/2484* (2016.02); *H01M 8/2485* (2013.01); *H01M 2008/1095* (2013.01)

(58) Field of Classification Search
    CPC ............. H01M 8/0267; H01M 8/0263; H01M 8/0273; H01M 8/2415; H01M 8/2485; H01M 8/0258; H01M 8/242; H01M 2008/1095
    See application file for complete search history.

(56) References Cited

U.S. PATENT DOCUMENTS

| | | | |
|---|---|---|---|
| 2006/0183015 A1* | 8/2006 | Tseng | ..................... B82Y 30/00 |
| | | | 429/410 |
| 2013/0004877 A1* | 1/2013 | Takeguchi | ............ H01M 8/242 |
| | | | 429/437 |

FOREIGN PATENT DOCUMENTS

| | | | |
|---|---|---|---|
| JP | 2000-164237 | A | 6/2000 |
| JP | 2001-006715 | A | 1/2001 |
| JP | 2004-327425 | A | 11/2004 |
| JP | 2007-141639 | A | 6/2007 |
| JP | 2008-103241 | A | 5/2008 |
| JP | 2009-099380 | A | 5/2009 |
| JP | 2009-129545 | A | 6/2009 |
| JP | 2009-158390 | A | 7/2009 |
| WO | 2008/050816 | A1 | 5/2008 |

OTHER PUBLICATIONS

International Search Report issued in International Application No. PCT/JP2013/001161 with dated May 7, 2013, with English Translation.

European Extended Search Report in European Patent Application No. 13852735.3, dated Oct. 23, 2015.

\* cited by examiner

POLYMER ELECTROLYTE FUEL CELL WITH A RECESS IS FORMED DOWNSTREAM OF A GAS LEAD-OUT PORT

RELATED APPLICATIONS

This application is the U.S. National Phase under 35 U.S.C. § 371 of International Application No. PCT/JP2013/001161, filed on Feb. 27, 2013, which in turn claims the benefit of Japanese Application No. 2012-244338, filed on Nov. 6, 2012, the disclosures of which are incorporated by reference herein.

TECHNICAL FIELD

The present invention relates to the configuration of a polymer electrolyte fuel cell.

BACKGROUND ART

To give ion conductivity to an electrolyte membrane, a reactant gas to be supplied to a polymer electrolyte fuel cell is humidified by, for example, a humidifier. However, depending on a temperature environment at the time of electric power generation, condensed water is generated in the reactant gas. In a case where droplets of the generated condensed water are accumulated in the fuel cell, the supply of the reactant gas is interfered, and an abnormal voltage reduction may occur.

To solve this problem, known is a fuel cell system in which a pipe coupled to a fuel cell stack is provided with an inclined portion that is inclined upward toward the fuel cell stack (see PTL 1, for example). Also known is a fuel cell system which includes a fuel cell stack body and a gas introducing portion extending in an end plate and communicating with a gas supply manifold and in which the gas introducing portion in the end plate is inclined downward from a side facing the gas supply manifold toward an upstream side of the flow of the reactant gas in the gas introducing portion (see PTL 2, for example).

In the fuel cell system disclosed in PTL 1 or 2, the pipe or the gas introducing portion is inclined, so that the condensed water generated in the pipe or the like is prevented from being supplied to the manifold.

Further known is a polymer electrolyte fuel cell in which a lowermost portion of a portion communicating with an inlet-side manifold of a gas channel is located above a gas supply pipe in the direction of gravitational force, the gas supply pipe being connected to the inlet-side manifold (see PTL 3, for example). In the polymer electrolyte fuel cell disclosed in PTL 3, even in a case where the condensed water is mixed in the reactant gas supplied to a stack, the condensed water is temporarily accumulated at a bottom portion of the manifold, so that the condensed water can be prevented from being selectively supplied to a specific cell (cell close to the gas supply pipe side).

CITATION LIST

Patent Literature

PTL 1: Japanese Laid-Open Patent Application Publication No. 2000-90954
PTL 2: Japanese Laid-Open Patent Application Publication No. 2009-99380
PTL 3: Japanese Laid-Open Patent Application Publication No. 2004-327425

SUMMARY OF INVENTION

Technical Problem

However, the fuel cell system disclosed in each of PTLs 1 and 2 has a first problem that since the ingress of the condensed water cannot be adequately prevented depending on the inclination angle, the abnormal voltage reduction cannot be prevented.

Further, the fuel cell system disclosed in PTL 2 has a second problem that since the shape of the gas introducing portion is complex, it is difficult to attach the gas introducing portion to the stack, and this decreases the mass productivity of the stack.

Further, the polymer electrolyte fuel cell disclosed in PTL 3 has a third problem that since there is a wasteful space in the layout of a cell surface, the size reduction cannot be realized.

The present invention was made to solve at least one of the first, second, and third problems, and an object of the present invention is to provide a polymer electrolyte fuel cell capable of preventing clogging of a reactant gas channel by condensed water while realizing a simple (compact) structure in consideration of mass productivity.

Solution to Problem

To solve the above conventional problems, a polymer electrolyte fuel cell according to the present invention includes: a unit cell including a membrane-electrode assembly and a pair of plate-shaped separators provided so as to contact the membrane-electrode assembly, the membrane-electrode assembly including a polymer electrolyte membrane and a pair of electrodes sandwiching the polymer electrolyte membrane, groove-shaped gas channels through which reactant gases respectively flow being respectively formed on main surfaces of the electrodes or main surfaces of the separators; manifolds formed so as to respectively communicate with inlet portions of the gas channels; a gas introducing member including a gas introducing port, a gas lead-out port, and a first gas passage formed such that the gas introducing port and the gas lead-out port communicate with each other; and a first member including a main surface on which a communication portion is formed, wherein: a recess is formed at the gas lead-out port side of the gas introducing member so as to be connected to the gas lead-out port; the first member is provided such that the communication portion communicates with one of the manifolds; the gas introducing member is provided such that the recess communicates with the communication portion, and when viewed from a thickness direction of the polymer electrolyte membrane, the gas lead-out port and a main surface of the first member overlap each other; and a second gas passages is constituted by the recess of the gas introducing member and the main surface of the first member.

With this, when the reactant gas flowing through the first gas passage of the gas introducing member is led out from the gas lead-out port to the second gas passage, the reactant gas hits the main surface of the first member. Therefore, the condensed water in the reactant gas is prevented from being directly supplied to the manifold hole, and therefore, prevented from being supplied to the gas channel. Thus, the clogging of the gas channel can be prevented.

The above object, other objects, features, and advantages of the present invention will be made clear by the following detailed explanation of preferred embodiments with reference to the attached drawings.

Advantageous Effects of Invention

According to the polymer electrolyte fuel cell of the present invention, both the prevention of the abnormal voltage reduction caused by the clogging of the gas channel by the condensed water in the reactant gas and the improvement of the mass productivity of the fuel cell can be realized by a simple configuration.

DESCRIPTION OF EMBODIMENTS

Figure 1:
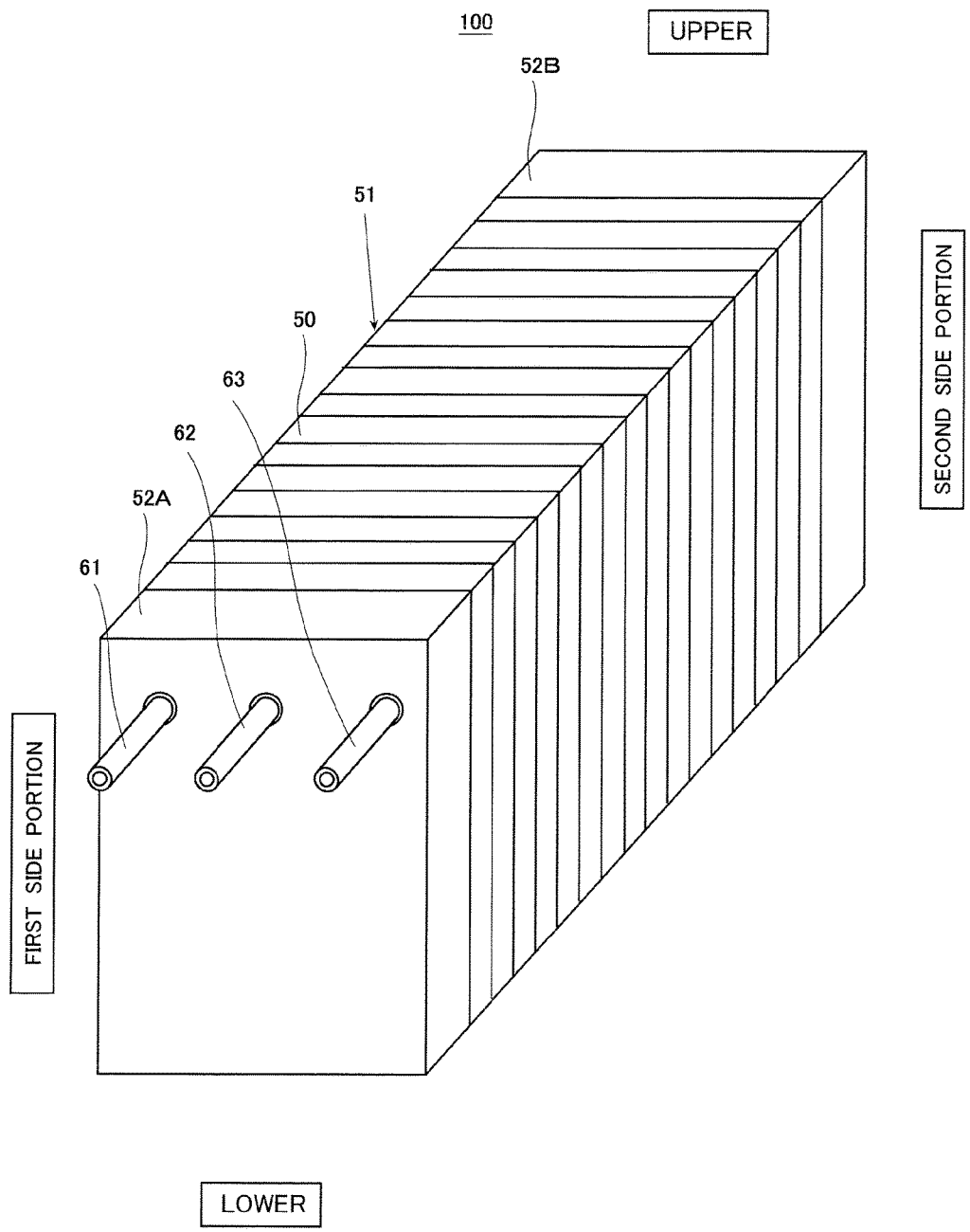
FIG. 1 is a perspective view schematically showing a schematic configuration of a polymer electrolyte fuel cell according to Embodiment 1.

Hereinafter, preferred embodiments of the present invention will be explained in reference to the drawings. In the drawings, the same reference signs are used for the same or corresponding components, and a repetition of the same explanation is avoided. Further, in the drawings, only the components necessary to explain the present invention are shown, and the other components may be omitted. Furthermore, the present invention is not limited to the embodiments below.

Embodiment 1

A polymer electrolyte fuel cell according to Embodiment 1 includes: a unit cell including a membrane-electrode assembly and a pair of plate-shaped separators provided so as to contact the membrane-electrode assembly, the membrane-electrode assembly including a polymer electrolyte membrane and a pair of electrodes sandwiching the polymer electrolyte membrane, groove-shaped gas channels through which reactant gases respectively flow being respectively formed on main surfaces of the electrodes or main surfaces of the separators; manifolds formed so as to respectively communicate with inlet portions of the gas channels; a gas introducing member including a gas introducing port, a gas lead-out port, and a first gas passage formed such that the gas introducing port and the gas lead-out port communicate with each other; and a first member including a main surface on which a communication portion is formed, wherein: a recess is formed at the gas lead-out port side of the gas introducing member so as to be connected to the gas lead-out port; the first member is provided such that the communication portion communicates with one of the manifolds; the gas introducing member is provided such that the recess communicates with the communication portion, and when viewed from a thickness direction of the polymer electrolyte membrane, the gas lead-out port and a main surface of the first member overlap each other; and a second gas passages is constituted by the recess of the gas introducing member and the main surface of the first member.

The polymer electrolyte fuel cell according to Embodiment 1 may be configured such that the first member and the gas introducing member are formed such that a flow direction of the reactant gas in the first gas passage and a flow direction of the reactant gas in the second gas passage intersect with each other at right angle.

The polymer electrolyte fuel cell according to Embodiment 1 may be configured such that the gas introducing member is provided such that when viewed from the thickness direction of the polymer electrolyte membrane, the gas lead-out port and the one manifold do not overlap each other.

The polymer electrolyte fuel cell according to Embodiment 1 may be configured such that: the inlet portions of the gas channels of the separators are formed such that the reactant gases flow in a vertical direction; and when viewed from the thickness direction of the polymer electrolyte membrane, the gas introducing member is provided in a region other than a region defined by projecting the inlet portion of the gas channel, where the gas introducing member is provided, in a vertically upper direction.

The polymer electrolyte fuel cell according to Embodiment 1 may be configured such that: the first member is an edge-side separator located at an uppermost stream side in the flow direction of the reactant gas; and the communication portion is a manifold hole formed on a main surface of the edge-side separator.

The polymer electrolyte fuel cell according to Embodiment 1 may be configured such that a hydrophilic property of a water holding portion that is a portion, forming the second gas passage, of the first member is higher than that of a portion of the first member other than the water holding portion.

Further, the polymer electrolyte fuel cell according to Embodiment 1 may be configured such that: a gas pipe through which the reactant gas flows is connected to the gas introducing member; and a hydrophilic property of the water holding portion is higher than that of an inner peripheral surface of the gas pipe.

Hereinafter, one example of the polymer electrolyte fuel cell according to Embodiment 1 will be explained in detail in reference to the drawings.

Configuration of Polymer Electrolyte Fuel Cell

Figure 2:
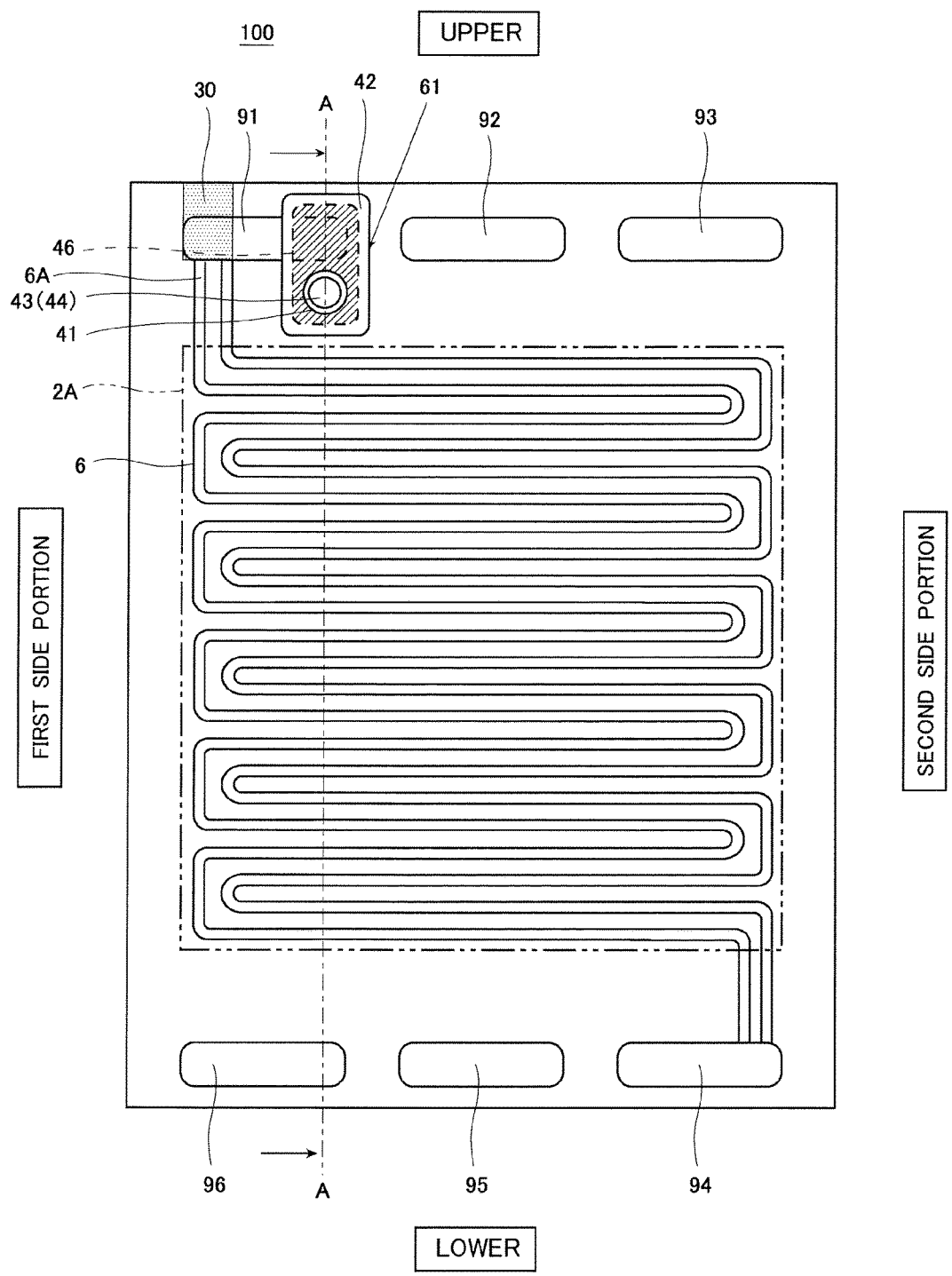
FIG. 2 is a transparent view of the polymer electrolyte fuel cell shown in FIG. 1.
Figure 3:
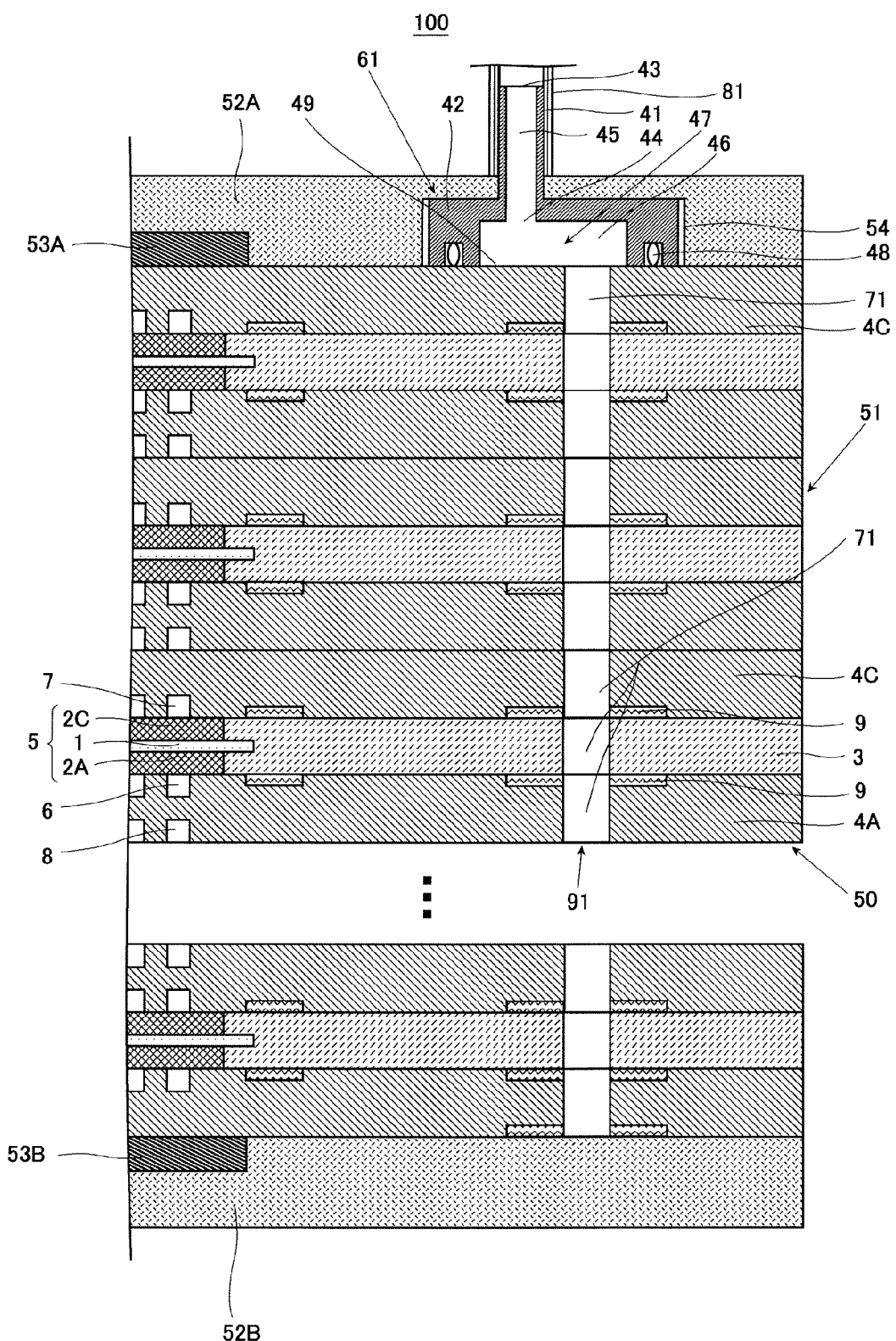
FIG. 3 is a cross-sectional view taken along line A-A of FIG. 2.

FIG. 1 is a perspective view schematically showing a schematic configuration of a polymer electrolyte fuel cell according to Embodiment 1. FIG. 2 is a transparent view of the polymer electrolyte fuel cell shown in FIG. 1 and schematically shows a positional relation among a manifold, a first member, a gas introducing member, and the like. FIG. 3 is a cross-sectional view taken along line A-A of FIG. 2.

An upper-lower direction of the polymer electrolyte fuel cell corresponds to an upper-lower direction of each of FIGS. 1 and 2. To clearly show respective members in FIG. 2, some members are shown by solid lines, and an oxidizing gas introducing member and the like are omitted. Further, a part of the polymer electrolyte fuel cell is omitted from FIG. 3.

As shown in FIG. 1, a polymer electrolyte fuel cell 100 according to Embodiment 1 includes: a cell stack body 51 configured by stacking unit cells 50; a pair of end plates 52A and 52B; a fuel gas introducing member (gas introducing member) 61; a cooling medium introducing member 62; and an oxidizing gas introducing member (gas introducing member) 63. The cell stack body 51 is provided with a fuel gas supply manifold 91, a cooling medium supply manifold 92, an oxidizing gas supply manifold 93, a fuel gas discharge manifold 94, a cooling medium discharge manifold 95, and an oxidizing gas discharge manifold 96 (see FIG. 2).

Specifically, the fuel gas supply manifold 91, the cooling medium supply manifold 92, and the oxidizing gas supply manifold 93 are provided at an upper portion of the polymer electrolyte fuel cell 100. The fuel gas discharge manifold 94, the cooling medium discharge manifold 95, and the oxidizing gas discharge manifold 96 are provided at a lower portion of the polymer electrolyte fuel cell 100. When viewed from a stack direction of the unit cells 50, each of these manifolds is formed so as to have a long diameter in a horizontal direction and a short diameter in the upper-lower direction.

The pair of end plates 52A and 52B are provided so as to sandwich the cell stack body 51. A current collector 53A is provided between the end plate 52A and the cell stack body 51, and a current collector 53B is provided between the end plate 52B and the cell stack body 51.

The end plate 52A, the current collector 53A, the cell stack body 51, the current collector 53B, and the end plate 52B are fastened to one another by fastening members, not shown. Embodiment 1 describes a case where the end plate 52A is made of an insulating material, such as resin. However, in a case where the end plate 52A is made of an electrically-conductive material, such as a metal material, insulating plates need to be respectively inserted between the end plate 52A and the current collector 53A and between the end plate 52B and the current collector 53B.

The fuel gas introducing member 61 is provided at the upper portion of the polymer electrolyte fuel cell 100 and one (hereinafter referred to as a "first side portion") of side portions of the polymer electrolyte fuel cell 100. The oxidizing gas introducing member 63 is provided at the upper portion of the polymer electrolyte fuel cell 100 and the other side portion (hereinafter referred to as a "second side portion") of the polymer electrolyte fuel cell 100. The cooling medium introducing member 62 is provided between the fuel gas introducing member 61 and the oxidizing gas introducing member 63.

A fuel gas supply pipe (gas pipe) 81 through which a fuel gas (reactant gas) flows is connected to the fuel gas introducing member 61 (see FIG. 3). A cooling medium supply pipe through which a cooling medium flows is connected to the cooling medium introducing member 62, and an oxidizing gas supply pipe (gas pipe) through which an oxidizing gas (reactant gas) flows is connected to the oxidizing gas introducing member 63 (both not shown). Specific configurations of the fuel gas introducing member 61 and the like will be described later.

Configuration of Unit Cell

Next, the configuration of the unit cell 50 will be explained in reference to FIGS. 1 to 3.

As shown in FIGS. 1 to 3, the unit cell 50 includes: a MEA (membrane-electrode assembly) 5 including a polymer electrolyte membrane 1 and a pair of electrodes 2A and 2C; a frame 3; a first separator 4A; and a second separator 4C.

The polymer electrolyte membrane 1 has a substantially quadrangular shape (herein, a rectangular shape). As with the polymer electrolyte membrane 1, the frame 3 has a substantially quadrangular shape (herein, a rectangular shape). The frame 3 is provided so as to sandwich a peripheral portion of the polymer electrolyte membrane 1. Manifold holes, such as a fuel gas supply manifold hole 71, are formed on a main surface of the frame 3 (see FIG. 3).

It is preferable that the frame 3 be made of an insulating material, such as polypropylene (PP), polyphenylene sulfide resin (PPS), or liquid crystal polymer (LCP). The frame 3 can be formed by, for example, injection molding.

The pair of electrodes 2A and 2C are respectively provided on both surfaces of the polymer electrolyte membrane 1 so as to be located at an inner side of the peripheral portion of the polymer electrolyte membrane 1. Each of the electrodes 2A and 2C includes a catalyst layer and a gas diffusion layer provided on the catalyst layer (both not shown). Since the electrodes 2A and 2C (the catalyst layer and the gas diffusion layer) are configured in the same manner as electrodes of a typical polymer electrolyte fuel cell, detailed explanations thereof are omitted.

A pair of gaskets 9 are respectively provided on both surfaces of the frame 3. Each of the gaskets 9 is constituted by: a portion surrounding the electrode 2A or the electrode 2C; a portion surrounding the manifold hole, such as the fuel gas supply manifold hole 71 formed on the first separator 4A or the fuel gas supply manifold hole 71 formed on the second separator 4C described below; and a portion connecting these portions. With this, the fuel gas and the oxidizing gas are prevented from leaking to the outside of the cell, and the gases are prevented from being mixed with each other in the unit cell 50.

The gasket 9 may have any shape as long as the fuel gas and the oxidizing gas are prevented from leaking to the outside of the cell, and the gases are prevented from being mixed with each other in the unit cell 50.

The first separator 4A and the second separator 4C are provided so as to sandwich the MEA 5, the frame 3, and the gaskets 9. With this, the MEA 5 is mechanically fixed, and when a plurality of fuel cells 50 are stacked in a thickness direction of the fuel cell 50, the MEAs 5 are electrically connected to one another. Each of the first separator 4A and the second separator 4C may be a resin-impregnated graphite plate formed by impregnating a graphite plate with phenol resin and then curing the resin or may be made of a metal material, such as SUS.

A groove-shaped first reactant gas channel 6 through which the fuel gas flows is formed on one (hereinafter referred to as an "inner surface") of main surfaces of the first separator 4A, the one main surface contacting the electrode 2A (see FIGS. 2 and 3). Specifically, the first reactant gas channel 6 is constituted by one or more (herein, two) grooves and is configured such that the fuel gas supply manifold hole 71 and a fuel gas discharge manifold hole (not shown) communicate with each other. The first reactant gas channel 6 includes an inlet portion 6A formed to communicate with the fuel gas supply manifold hole 71 and extend in the upper-lower direction (vertical direction). The first reactant gas channel 6 is formed in a serpentine shape as a whole.

A groove-shaped cooling medium channel 8 through which the cooling medium flows is formed on the other main surface (hereinafter referred to as an "outer surface") of the first separator 4A. In Embodiment 1, the first reactant gas channel 6 is formed in a serpentine shape. However, the first reactant gas channel 6 may be formed in a straight shape or a spiral shape. The cooling medium channel 8 may be formed in a serpentine shape, a straight shape, a spiral shape, or the like. Further, the cooling medium may be water, an antifreezing fluid (such as an ethylene glycol-containing liquid), or the like.

A groove-shaped second reactant gas channel 7 through which the oxidizing gas flows is provided at one (hereinafter referred to as an "inner surface") of main surfaces of the second separator 4C, the one main surface contacting the electrode 2C. The second reactant gas channel 7 may be formed in a serpentine shape, a straight shape, a spiral shape, or the like. The cooling medium channel 8 may be formed on the other main surface (hereinafter referred to as an "outer surface") of the second separator 4C.

With this, the fuel gas and the oxidizing gas are respectively supplied to the electrode 2A and the electrode 2C, and these reactant gases react with each other to generate electricity and heat. The cooling medium flows through the cooling medium channel 8 to recover the generated heat.

A plurality of unit cells 50 configured as above are stacked to form the cell stack body 51. At this time, the fuel gas supply manifold hole 71 and the like formed on the frame 3 and the like are connected to one another to form the fuel gas supply manifold 91.

In Embodiment 1, a so-called inner manifold type fuel cell (fuel cell stack) is adopted as the polymer electrolyte fuel cell 100. However, the present embodiment is not limited to this, and an outer manifold type fuel cell (fuel cell stack) may be adopted. In Embodiment 1, a plurality of unit cells 50 are stacked to form the cell stack body 51. However, the present embodiment is not limited to this, and a single unit cell 50 may be sandwiched between the end plates 52A and 52B.

Configurations of Fuel Gas Introducing Member and First Member

Next, the fuel gas introducing member 61 and the first member will be explained in reference to FIGS. 1 to 3. Since the fuel gas introducing member 61 and the oxidizing gas introducing member 63 are the same in configuration as each other, an explanation of the configuration of the oxidizing gas introducing member 63 is omitted.

The fuel gas introducing member 61 includes a tubular portion 41 and a base portion 42 having a rectangular solid shape. The fuel gas introducing member 61 is accommodated in an accommodating portion 54 formed on the end plate 52A and having a step. The fuel gas introducing member 61 is provided so as to contact the outer surface of the second separator 4C (hereinafter referred to as an "edge-side second separator 4C") located so as to contact the end plate 52A (located at an uppermost stream side in a flow direction of the fuel gas. To be specific, in Embodiment 1, the edge-side second separator 4C constitutes the first member, and the fuel gas supply manifold hole 71 of the edge-side second separator 4C constitutes the communication portion.

The tubular portion 41 of the fuel gas introducing member 61 is formed in a tubular shape. One of end portions of the tubular portion 41 constitutes a gas introducing port 43, and the other end portion thereof constitutes a gas lead-out port 44. An internal space of the tubular portion 41 constitutes a first gas passage 45.

A recess 46 is formed on one (hereinafter referred to as an "inner surface") of main surfaces of the base portion 42 so as to communicated with (be connected to) the gas lead-out port 44. An O ring 48 is provided at a portion of an inner surface of the base portion 42, the portion contacting the outer surface of the edge-side second separator 4C. With this, the fuel gas can be prevented from leaking from the fuel gas introducing member 61 to the outside of the cell.

The recess 46 and the outer surface of the edge-side second separator 4C constitute a second gas passage 47. The fuel gas introducing member 61 and the edge-side second separator 4C are configured such that the flow direction of the fuel gas in the first gas passage 45 and the flow direction of the fuel gas in the second gas passage 47 intersect with each other at right angle.

Specifically, the tubular portion 41 of the fuel gas introducing member 61 is configured such that the flow direction of the fuel gas in the first gas passage 45 (a central axis of the tubular portion 41) coincides with a normal direction of the outer surface of the edge-side second separator 4C. The base portion 42 of the fuel gas introducing member 61 is configured such that the inner surface of the base portion 42 is parallel to the main surface of the edge-side second separator 4C.

The fuel gas introducing member 61 and the cell stack body 51 are configured such that the flow direction of the fuel gas in the second gas passage 47 and the flow direction of the fuel gas in the fuel gas supply manifold 91 intersect with each other at right angle.

With this, the configuration of the pipe can be reduced in size. Therefore, the prevention of the abnormal voltage reduction caused by the clogging of the gas channel by the condensed water in the reactant gas and the improvement of the mass productivity of the polymer electrolyte fuel cell 100 can be realized without restricting the degree of freedom of the design of the polymer electrolyte fuel cell 100, and therefore, a fuel cell system.

The right angle does not denote just 90° but denotes a range (for example) 90±2° that allows a slight unavoidable manufacturing error. A portion, forming the second gas passage 47, of the outer surface of the edge-side second separator 4C is a water holding portion 49.

The fuel gas introducing member 61 may be made of a resin material or a metal material. Examples of the resin material include polypropylene (PP), polyphenylene sulfide (PPS), polyethylene terephthalate (PET), and polytetrafluoroethylene (PTFE). One example of the metal material is SUS. To prevent the corrosion of the fuel gas introducing member 61, the resin material is more preferable.

It is preferable that to remove small droplets of the condensed water, the water holding portion 49 be configured such that a hydrophilic property thereof is higher than that of a portion of the outer surface of the edge-side second separator 4C other than the water holding portion 49. Similarly, it is preferable that to remove small droplets of the condensed water, the water holding portion 49 be configured such that the hydrophilic property thereof is higher than that of an inner peripheral surface of the fuel gas supply pipe 81. One example of a method of improving the hydrophilic property of the water holding portion 49 is a method of, in a case where carbon is used as a material of the edge-side second separator 4C, changing the surface roughness by a plasma treatment, a blast treatment, or the like.

The fuel gas introducing member 61 is provided such that: the recess 46 communicates with the fuel gas supply manifold hole 71 (communication portion) of the edge-side second separator 4C; and when viewed from the thickness direction of the polymer electrolyte membrane 1, the gas lead-out port 44 and the main surface of the edge-side second separator 4C overlap each other.

In Embodiment 1, the fuel gas introducing member 61 is provided such that when viewed from the thickness direction of the polymer electrolyte membrane 1, the gas lead-out port 44 does not overlap the fuel gas supply manifold 91. More specifically, the fuel gas introducing member 61 is provided such that when viewed from the thickness direction of the polymer electrolyte membrane 1, the gas lead-out port 44 does not overlap the fuel gas supply manifold 91 and is located in a region other than a region 30 defined by projecting the inlet portion 6A of the first reactant gas channel 6 in a vertically upper direction (see FIG. 2).

Specifically, the fuel gas introducing member 61 is provided such that when viewed from the thickness direction of the polymer electrolyte membrane 1, the gas lead-out port 44 is located at a vertically lower side of the fuel gas supply manifold 91.

Operations and Operational Advantages of Polymer Electrolyte Fuel Cell

Next, operational advantages of the polymer electrolyte fuel cell 100 according to Embodiment 1 will be explained in reference to FIGS. 1 to 3. Since the operational advantages of the fuel gas introducing member 61 are the same as those of the oxidizing gas introducing member 63, the operational advantages of the oxidizing gas introducing member 63 (the operational advantages of the oxidizing gas side) are omitted in the following explanations.

In the fuel cell system including the polymer electrolyte fuel cell 100, typically, the fuel gas (or the oxidizing gas) is humidified by a humidifier, not shown, and then supplied to the polymer electrolyte fuel cell 100.

Specifically, the humidified fuel gas flows through the fuel gas supply pipe 81 to be introduced to the gas introducing port 43 of the fuel gas introducing member 61. While the humidified fuel gas flows through the fuel gas supply pipe 81, the humidified fuel gas may condense in the fuel gas supply pipe 81 depending on an ambient temperature.

The fuel gas introduced to the gas introducing port 43 of the fuel gas introducing member 61 flows through the first gas passage 45 in the horizontal direction to be led out from the gas lead-out port 44 toward the fuel gas supply manifold 91.

Here, in the polymer electrolyte fuel cell 100 according to Embodiment 1, the fuel gas introducing member 61 is provided such that when viewed from the thickness direction of the polymer electrolyte membrane 1, the gas lead-out port 44 and the main surface of the edge-side second separator 4C overlap each other.

On this account, the fuel gas led out from the gas lead-out port 44 hits the water holding portion 49 of the edge-side second separator 4C, so that the flow direction thereof changes to a vertically upper direction. Then, the fuel gas flows through the second gas passage 47 to be supplied to the fuel gas supply manifold 91. To be specific, the fuel gas led out from the gas lead-out port 44 is not directly supplied to the fuel gas supply manifold 91.

While the fuel gas supplied to the fuel gas supply manifold 91 flows through the fuel gas supply manifold 91, the fuel gas separately flows to the inlet portions 6A of the first reactant gas channels 6 of the unit cells 50. The fuel gas separately flowing to the inlet portions 6A flows through the first reactant gas channels 6 to be discharged through the fuel gas discharge manifold 94 and a fuel gas discharge pipe, not shown, to the outside of the polymer electrolyte fuel cell 100.

When the water condensed in the fuel gas supply pipe 81 is led out from the gas lead-out port 44, the inertia by the flow of the fuel gas acts on the condensed water, so that the condensed water hits the water holding portion 49 to be held in the water holding portion 49 (in the second gas passage 47).

Therefore, the condensed water is not directly supplied to the fuel gas supply manifold 91, so that the condensed water can be prevented from flowing from the fuel gas supply manifold 91 into the inlet portion 6A of the first reactant gas channel 6. On this account, the clogging of the first reactant gas channel 6 by the condensed water can be prevented, and the abnormal voltage reduction can be prevented.

As above, according to the polymer electrolyte fuel cell 100 of Embodiment 1, both the prevention of the abnormal voltage reduction caused by the clogging of the gas channel by the condensed water in the reactant gas and the improvement of the mass productivity of the fuel cell can be realized by a simple configuration.

In Embodiment 1, the fuel gas introducing member 61 and the edge-side second separator 4C are configured such that the flow direction of the fuel gas in the first gas passage 45 and the flow direction of the fuel gas in the second gas passage 47 intersect with each other at right angle. With this, the accommodating portion 54 formed on the end plate 52A can be formed in the vertical direction.

Therefore, for example, the positioning of the fuel gas introducing member 61 becomes easy. In addition, an operation of attaching the fuel gas introducing member 61 to the end plate 52A from an oblique direction becomes unnecessary. Therefore, the productivity can be further improved.

In Embodiment 1, the fuel gas introducing member 61 is provided such that when viewed from the thickness direction of the polymer electrolyte membrane 1, the gas lead-out port 44 does not overlap the fuel gas supply manifold 91. With this, the edge-side second separator 4C can be used (configured) as the first member. On this account, the number of components of the polymer electrolyte fuel cell 100 can be reduced, and the productivity can be improved by simplifying an assembling process.

In Embodiment 1, the fuel gas introducing member 61 is provided such that when viewed from the thickness direction of the polymer electrolyte membrane 1, the gas lead-out port 44 is located in a region other than the region 30. With this, the below-described operational advantages can be obtained.

To be specific, for example, in a case where the fuel gas introducing member 61 is provided such that the gas lead-out port 44 is located in the region 30, the condensed water held by the water holding portion 49 may flow into the fuel gas supply manifold 91 by gravity to clog the first reactant gas channel 6. However, in Embodiment 1, since the fuel gas introducing member 61 is provided such that the gas lead-out port 44 is located in a region other than the region 30, the clogging of the first reactant gas channel 6 by the condensed water can be prevented.

In Embodiment 1, the fuel gas introducing member 61 is provided such that when viewed from the thickness direction of the polymer electrolyte membrane 1, the gas lead-out port 44 is located at a vertically lower side of the fuel gas supply manifold 91. Therefore, the condensed water held by the water holding portion 49 can be prevented from flowing into the fuel gas supply manifold 91 by gravity.

Further, in Embodiment 1, the fuel gas introducing member 61 is provided such that a portion, communicating with the fuel gas supply manifold hole 71 of the edge-side second separator 4C, of the recess 46 (that is, a portion where the recess 46 and the fuel gas supply manifold hole 71 overlap each other when viewed from the thickness direction of the polymer electrolyte membrane 1) is located in a region other than a portion above the inlet portion 6A of the first reactant gas channel 6.

Therefore, even in a case where the condensed water that could not be held by the water holding portion 49 flows into the fuel gas supply manifold 91, the condensed water can be prevented from immediately flowing into the inlet portion 6A of the first reactant gas channel 6. In addition, since the condensed water is dispersed in the fuel gas supply manifold 91, the abnormal voltage reduction can be effectively avoided.

Modification Example 1 of Embodiment 1

Next, Modification Example of the polymer electrolyte fuel cell 100 according to Embodiment 1 will be explained in reference to FIG. 4.

Configuration of Polymer Electrolyte Fuel Cell

Figure 4:
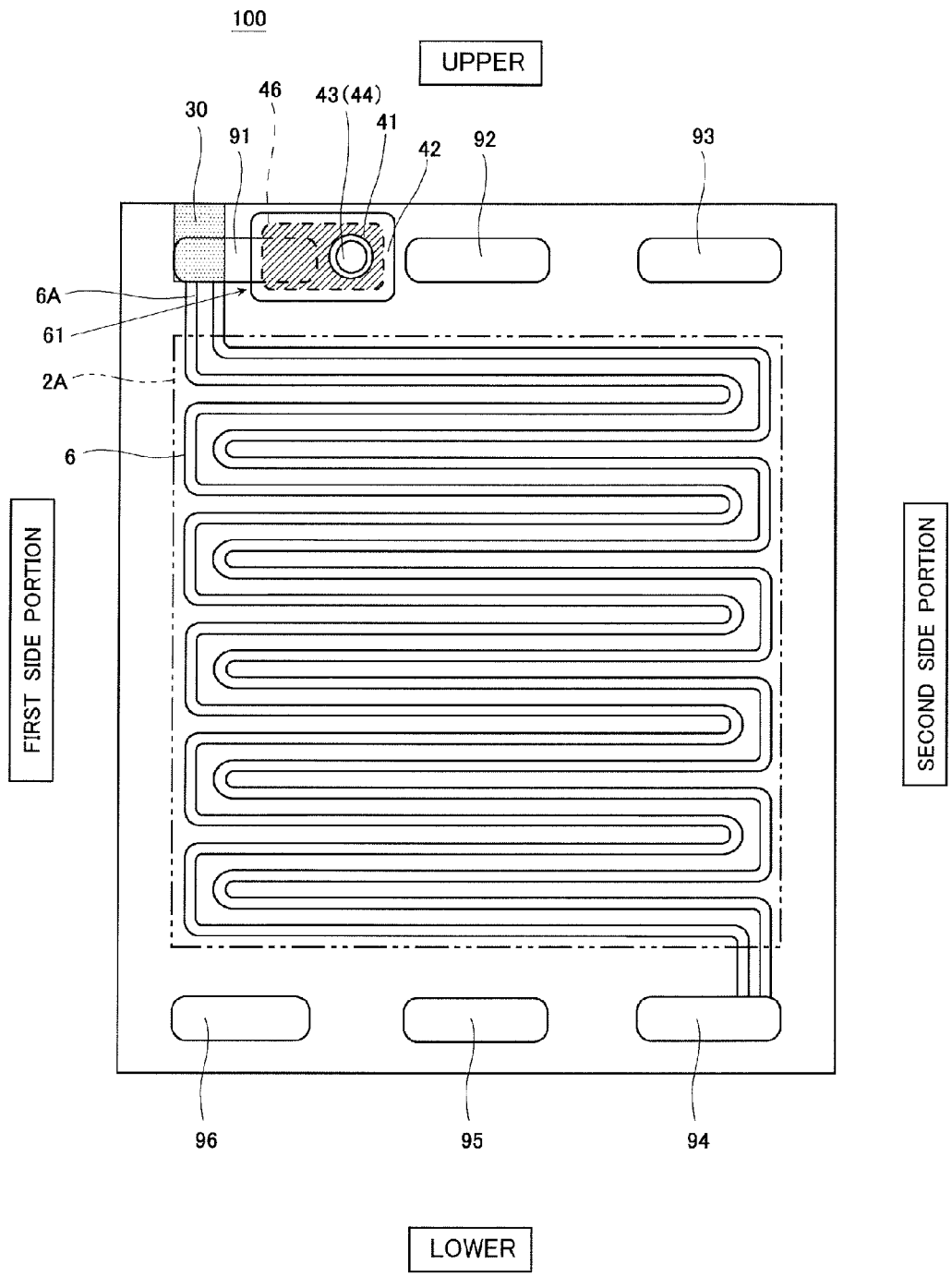
FIG. 4 is a transparent view of the polymer electrolyte fuel cell of Modification Example 1 of Embodiment 1.

FIG. 4 is a transparent view of the polymer electrolyte fuel cell of Modification Example 1 of Embodiment 1 and schematically shows a positional relation among the manifolds, the first member, the gas introducing member, and the like. The upper-lower direction of the polymer electrolyte fuel cell corresponds to the upper-lower direction of FIG. 4. To clearly show respective members in FIG. 4, some members are shown by solid lines, and the oxidizing gas introducing member and the like are omitted.

As shown in FIG. 4, the polymer electrolyte fuel cell 100 of Modification Example 1 of Embodiment 1 is the same in basic configuration as the polymer electrolyte fuel cell 100 of Embodiment 1. However, the polymer electrolyte fuel cell 100 of Modification Example 1 of Embodiment 1 is different from the polymer electrolyte fuel cell 100 of Embodiment 1 regarding the position of the fuel gas introducing member 61. Specifically, the fuel gas introducing member 61 is provided such that the tubular portion 41 is located between the fuel gas supply manifold 91 and the cooling medium supply manifold 92.

The polymer electrolyte fuel cell 100 of Modification Example 1 configured as above also has the same operational advantages as the polymer electrolyte fuel cell 100 of Embodiment 1.

Modification Example 2 of Embodiment 1

The polymer electrolyte fuel cell of Modification Example 2 of Embodiment 1 is configured such that: the inlet portions of the gas channels of the separators are formed such that the reactant gases flow in the horizontal direction; and when viewed from the thickness direction of the polymer electrolyte membrane, the gas introducing member is located in a region other than a region defined by projecting the manifold in a vertically upper direction.

Configuration of Polymer Electrolyte Fuel Cell

Figure 5:
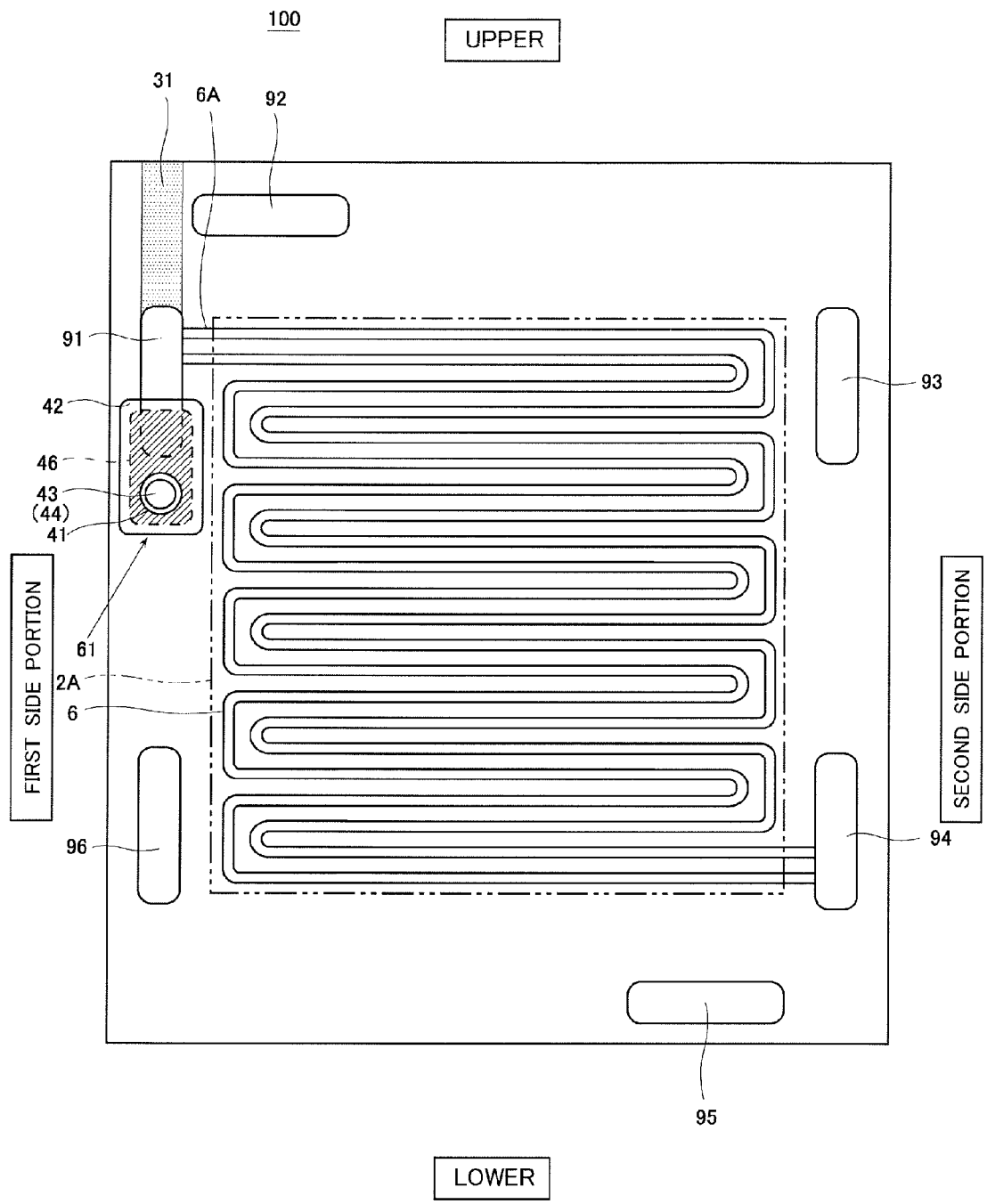
FIG. 5 is a transparent view of the polymer electrolyte fuel cell of Modification Example 2 of Embodiment 1.

FIG. 5 is a transparent view of the polymer electrolyte fuel cell of Modification Example 2 of Embodiment 1 and schematically shows a positional relation among the manifolds, the first member, the gas introducing member, and the like. The upper-lower direction of the polymer electrolyte fuel cell corresponds to the upper-lower direction of FIG. 5. To clearly show respective members in FIG. 5, some members are shown by solid lines, and the oxidizing gas introducing member and the like are omitted.

As shown in FIG. 5, the polymer electrolyte fuel cell 100 of Modification Example 2 of Embodiment 1 is the same in basic configuration as the polymer electrolyte fuel cell 100 of Embodiment 1. However, the polymer electrolyte fuel cell 100 of Modification Example 2 of Embodiment 1 is different from the polymer electrolyte fuel cell 100 of Embodiment 1 regarding the positions of the manifolds, such as the fuel gas supply manifold 91, the direction (position) of the inlet portion 6A of the first reactant gas channel 6, and the position of the fuel gas introducing member 61.

Specifically, the cooling medium supply manifold 92 is provided at the upper portion of the polymer electrolyte fuel cell 100 and the first side portion (that is, at the position of the fuel gas supply manifold 91 of Embodiment 1). The fuel gas supply manifold 91 is located at a position outside and under the cooling medium supply manifold 92 so as to have a long diameter in the upper-lower direction. The oxidizing gas supply manifold 93 is provided at a position opposed to the fuel gas supply manifold 91 such that the electrode 2A is sandwiched between the fuel gas supply manifold 91 and the oxidizing gas supply manifold 93.

Similarly, the cooling medium discharge manifold 95 is provided at the lower portion of the polymer electrolyte fuel cell 100 and the second side portion (that is, at the position of the cooling medium supply manifold 92 of Embodiment 1). The fuel gas discharge manifold 94 is provided at a position outside and above the cooling medium discharge manifold 95 so as to have a long diameter in the upper-lower direction. The oxidizing gas discharge manifold 96 is provided at a position opposed to the fuel gas discharge manifold 94 such that the electrode 2A is sandwiched between the fuel gas discharge manifold 94 and the oxidizing gas discharge manifold 96.

The inlet portion 6A of the first reactant gas channel 6 is formed such that the fuel gas flows in the horizontal direction. The fuel gas introducing member 61 is provided such that when viewed from the thickness direction of the polymer electrolyte membrane 1, the gas lead-out port 44 does not overlap the fuel gas supply manifold 91 and is located in a region other than a region 31 defined by projecting the fuel gas supply manifold 91 in a vertically upper direction.

More specifically, the fuel gas introducing member 61 is provided such that the gas lead-out port 44 is located under the fuel gas supply manifold 91. In Modification Example 2 of Embodiment 1, the fuel gas introducing member 61 is provided such that the gas lead-out port 44 is located under the fuel gas supply manifold 91. However, the present modification example is not limited to this. For example, the gas lead-out port 44 may be located at an inner side (second side portion side) of the fuel gas supply manifold 91 or at an outer side (first side portion side) of the fuel gas supply manifold 91. To be specific, the fuel gas introducing member 61 may be provided such that the gas lead-out port 44 is located in a region other than the region 31.

The polymer electrolyte fuel cell 100 of Modification Example 2 configured as above also has the same operational advantages as the polymer electrolyte fuel cell 100 according to Embodiment 1.

Embodiment 2

The polymer electrolyte fuel cell according to Embodiment 2 is configured such that the first member is the end plate.

Configuration of Polymer Electrolyte Fuel Cell

Figure 6:
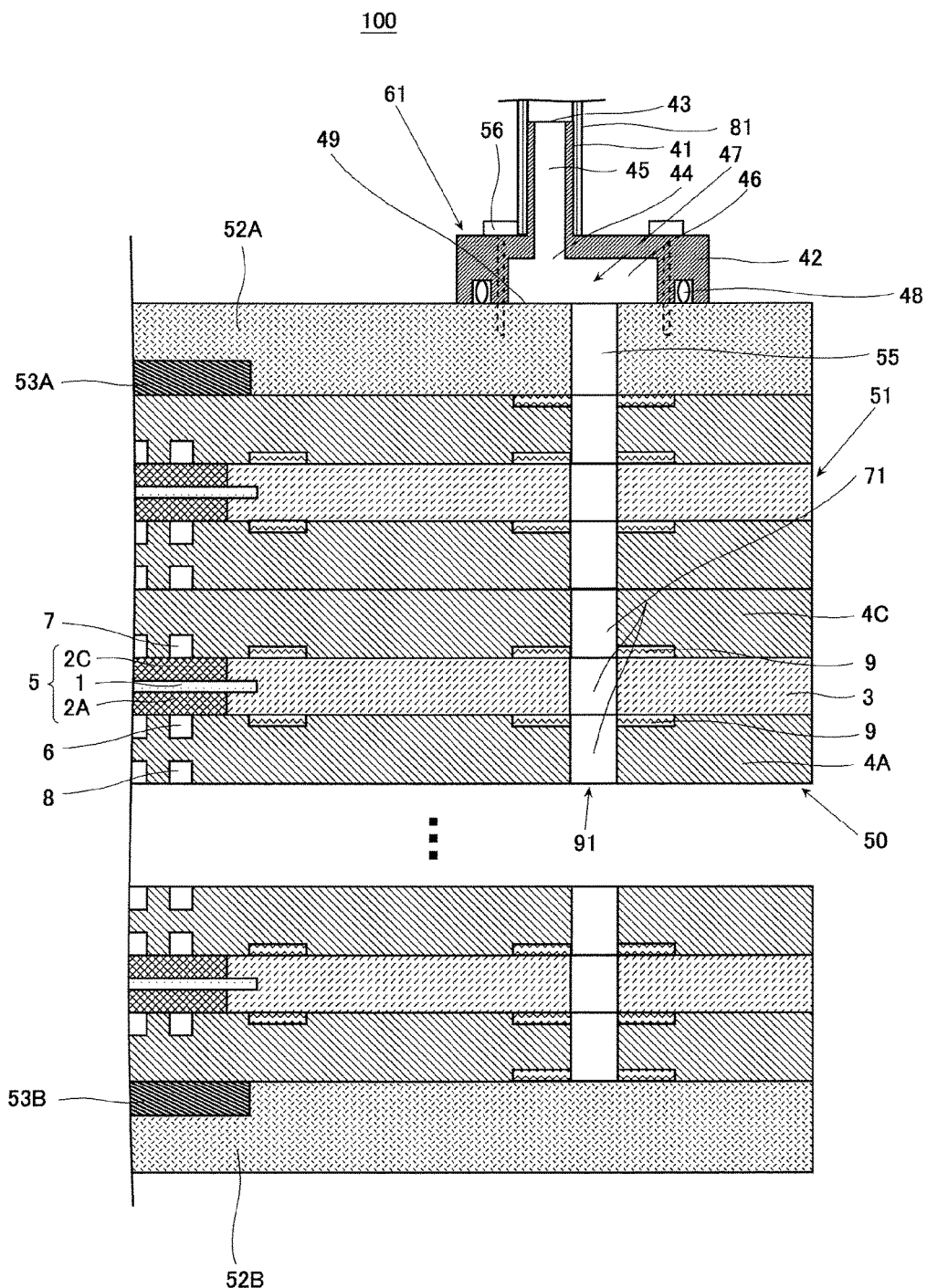
FIG. 6 is a cross-sectional view schematically showing a schematic configuration of the polymer electrolyte fuel cell according to Embodiment 2.

FIG. 6 is a cross-sectional view schematically showing a schematic configuration of the polymer electrolyte fuel cell according to Embodiment 2. A part of the polymer electrolyte fuel cell is omitted from FIG. 6.

As shown in FIG. 6, the polymer electrolyte fuel cell 100 according to Embodiment 2 is the same in basic configuration as the polymer electrolyte fuel cell 100 according to Embodiment 1. However, the polymer electrolyte fuel cell 100 according to Embodiment 2 is different from the polymer electrolyte fuel cell 100 according to Embodiment 1 in that the fuel gas introducing member 61 is attached to a main surface of the end plate 52A. To be specific, in Embodiment 2, the end plate 52A constitutes the first member.

Specifically, a through hole (communication portion) 55 is formed on the main surface of the end plate 52A so as to communicate with the fuel gas supply manifold 91. The through hole 55 is formed such that an opening thereof coincides with an opening of the fuel gas supply manifold hole 71. The fuel gas introducing member 61 is attached by screws 56 to one (hereinafter referred to as an "outer surface") of main surfaces of the end plate 52A, the one main surface not contacting the second separator 4C.

As with Embodiment 1, the fuel gas introducing member 61 is attached at such a position that: the recess 46 communicates with the through hole 55; and when viewed from the thickness direction of the polymer electrolyte membrane 1, the gas lead-out port 44 overlaps the outer surface of the end plate 52A. In Embodiment 2, the second gas passage 47 is constituted by the recess 46 and the outer surface of the end plate 52A, and a portion, forming the second gas passage 47, of the outer surface of the end plate 52A constitutes the water holding portion 49.

The polymer electrolyte fuel cell 100 according to Embodiment 2 configured as above also has the same operational advantages as the polymer electrolyte fuel cell 100 according to Embodiment 1.

In Embodiment 2, the fuel gas introducing member 61 is attached by the screws 56. However, the present embodiment is not limited to this. The fuel gas introducing member 61 may be attached to the end plate 52A so as to be screwed into the end plate 52A.

Embodiment 3

The polymer electrolyte fuel cell according to Embodiment 3 is configured such that the first member is a plate member.

Configuration of Polymer Electrolyte Fuel Cell

Figure 7:
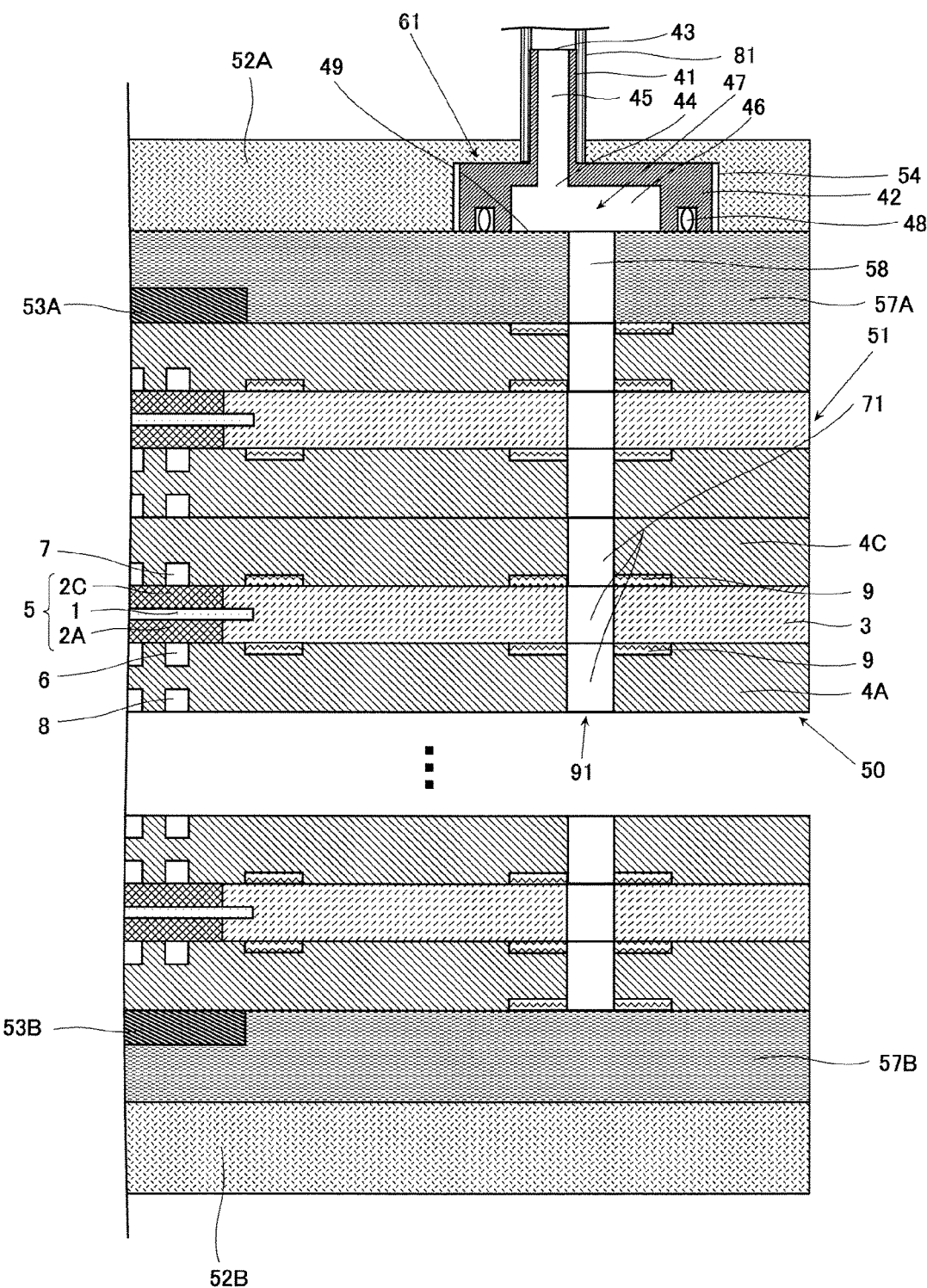
FIG. 7 is a cross-sectional view schematically showing a schematic configuration of the polymer electrolyte fuel cell according to Embodiment 3.

FIG. 7 is a cross-sectional view schematically showing a schematic configuration of the polymer electrolyte fuel cell according to Embodiment 3. A part of the polymer electrolyte fuel cell is omitted from FIG. 7.

As shown in FIG. 7, the polymer electrolyte fuel cell 100 according to Embodiment 3 is the same in basic configuration as the polymer electrolyte fuel cell 100 according to Embodiment 1. However, the polymer electrolyte fuel cell 100 according to Embodiment 3 is different from the polymer electrolyte fuel cell 100 according to Embodiment 1 in that: an insulating plate (plate member) 57A is provided between the end plate 52A and the cell stack body 51; and an insulating plate 57B is provided between the end plate 52B and the cell stack body 51. To be specific, the insulating plate 57A constitutes the first member.

A through hole (communication portion) 58 is formed on the main surface of the insulating plate 57A so as to communicate with the fuel gas supply manifold 91. The through hole 58 is formed such that an opening thereof coincides with the opening of the fuel gas supply manifold hole 71.

The fuel gas introducing member 61 is provided such that the inner surface of the base portion 42 contacts one (hereinafter referred to as an "outer surface") of main surfaces of the insulating plate 57A, the one main surface not contacting the second separator 4C. More specifically, as with Embodiment 1, the fuel gas introducing member 61 is provided at such a position that: the recess 46 communicates with the through hole 58; and when viewed from the thickness direction of the polymer electrolyte membrane 1, the gas lead-out port 44 overlaps the outer surface of the insulating plate 57A.

In Embodiment 3, the second gas passage 47 is constituted by the recess 46 and the outer surface of the insulating plate 57A, and a portion, forming the second gas passage 47, of the outer surface of the insulating plate 57A constitutes the water holding portion 49.

The polymer electrolyte fuel cell 100 according to Embodiment 3 is different from the polymer electrolyte fuel cell 100 according to Embodiment 1 in that: the current collector 53A is provided between the insulating plate 57A and the cell stack body 51; and the current collector 53B is provided between the insulating plate 57B and the cell stack body 51.

The polymer electrolyte fuel cell 100 according to Embodiment 3 configured as above also has the same operational advantages as the polymer electrolyte fuel cell 100 according to Embodiment 1.

Embodiment 4

The polymer electrolyte fuel cell according to Embodiment 4 is configured such that the gas introducing member is provided such that when viewed from the thickness direction of the polymer electrolyte membrane, the gas lead-out port and the manifold overlap each other.

The polymer electrolyte fuel cell according to Embodiment 4 may be configured such that: the inlet portion of the gas channel of the separator is formed such that the reactant gas flows in the vertical direction; and when viewed from the thickness direction of the polymer electrolyte membrane, the communication portion of the first member is provided in a region other than a region defined by projecting the inlet portion of the gas channel of the separator in a vertically upper direction.

With this, since the inlet portion of the gas channel does not exist at a position immediately under the communication portion of the first member in the direction of gravitational force, the clogging of the gas channel can be prevented more effectively than a case where the inlet portion of the gas channel exists at a position immediately under the communication portion of the first member in the direction of gravitational force.

The polymer electrolyte fuel cell according to Embodiment 4 may be configured such that the first member is accommodated in the recess.

The polymer electrolyte fuel cell according to Embodiment 4 may be configured such that: the first member is formed in a U shape and includes a pair of leg portions and a plate-shaped base portion; the communication portion is formed on a main surface of the base portion; and tip end portions of the leg portions of the first member are located at a bottom surface of the recess of the gas introducing member.

The polymer electrolyte fuel cell according to Embodiment 4 may be configured such that the area of the water holding portion that is a portion, forming the second gas passage, of the base portion of the first member is equal to or larger than one time the area of the opening of the communication portion.

Further, the polymer electrolyte fuel cell according to Embodiment 4 may be configured such that: the gas pipe through which the reactant gas flows is connected to the gas introducing member; and the hydrophilic property of the water holding portion is higher than that of the inner peripheral surface of the gas pipe.

Configuration of Polymer Electrolyte Fuel Cell

Figure 8:
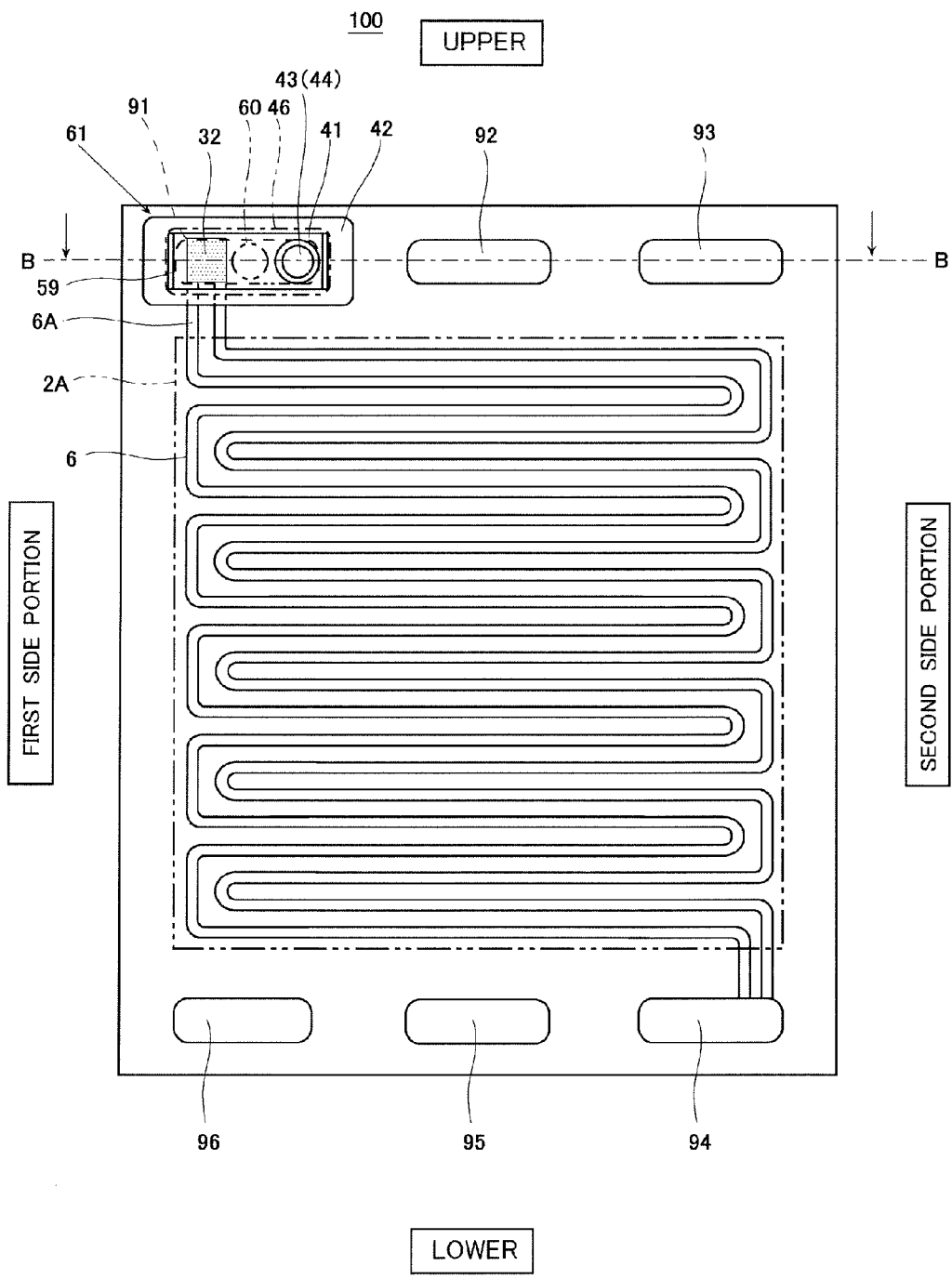
FIG. 8 is a transparent view of the polymer electrolyte fuel cell according to Embodiment 4.
Figure 9:
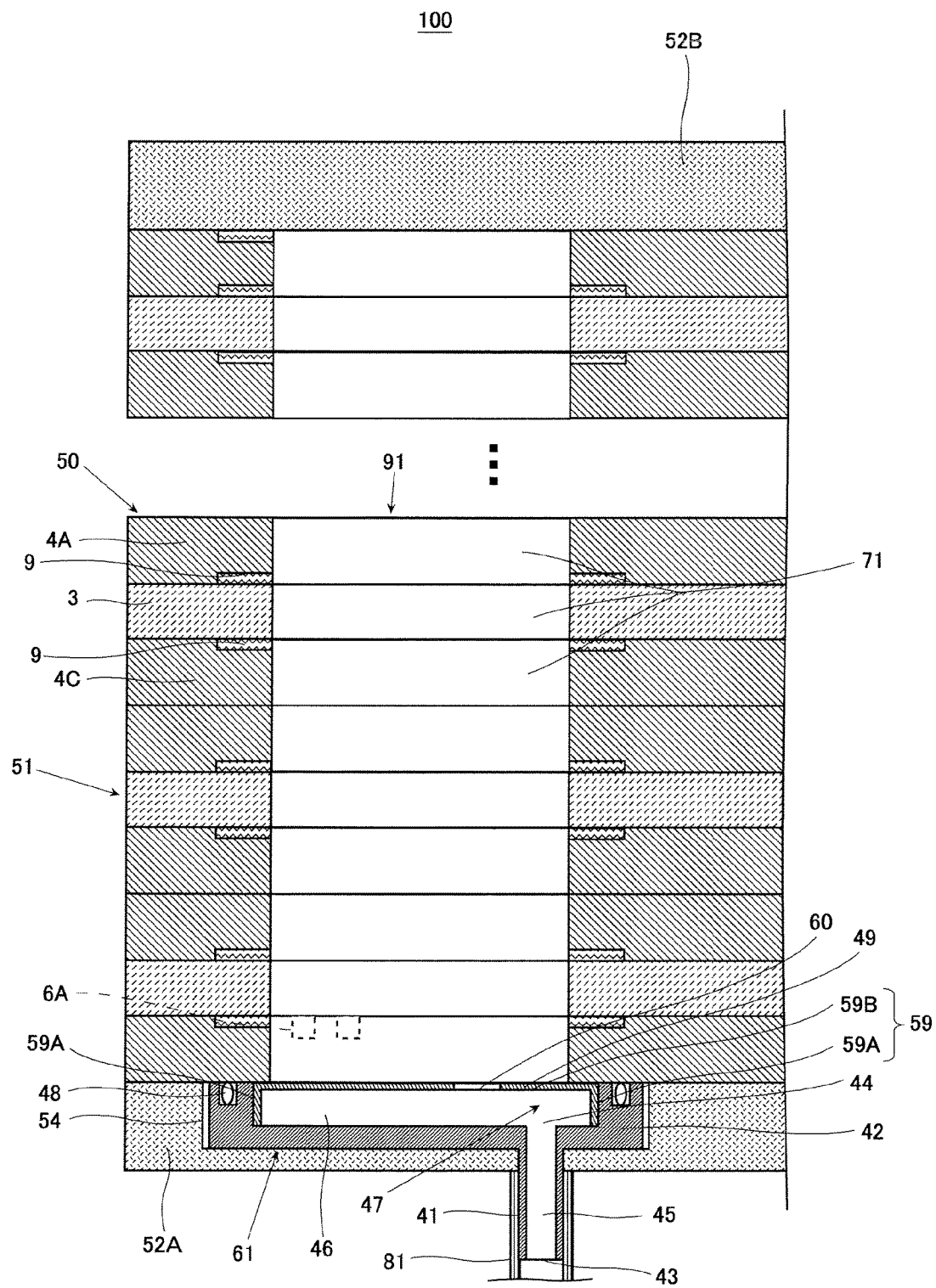
FIG. 9 is a cross-sectional view taken along line B-B of FIG. 8.

FIG. 8 is a transparent view of the polymer electrolyte fuel cell according to Embodiment 4 and schematically shows a positional relation among the manifolds, the first member, the gas introducing member, and the like. FIG. 9 is a cross-sectional view taken along line B-B of FIG. 8.

The upper-lower direction of the polymer electrolyte fuel cell corresponds to the upper-lower direction of FIG. 8. To clearly show respective members in FIG. 8, some members are shown by solid lines and the like, and the oxidizing gas introducing member and the like are omitted. A part of the polymer electrolyte fuel cell is omitted from FIG. 9.

As shown in FIGS. 8 and 9, the polymer electrolyte fuel cell 100 according to Embodiment 4 is the same in basic configuration as the polymer electrolyte fuel cell 100 according to Embodiment 1. However, the polymer electrolyte fuel cell 100 according to Embodiment 4 is different from the polymer electrolyte fuel cell 100 according to Embodiment 1 in that: the fuel gas introducing member 61 is provided to overlap the fuel gas supply manifold 91 when viewed from the thickness direction of the polymer electrolyte membrane 1; and a first member 59 is accommodated in the recess 46 of the fuel gas introducing member 61.

Specifically, the first member 59 is formed in a U shape and includes a pair of leg portions 59A and a plate-shaped base portion 59B. The leg portions 59A are respectively provided at both ends of the base portion 59B. In Embodiment 4, the first member 59 is formed in a U shape. However, the present embodiment is not limited to this. For example, the first member 59 may be constituted by a tubular portion (frame portion) and a plate-shaped base portion that closes one of ends of the tubular portion (frame portion).

The main surface of the base portion 59B is formed in a substantially rectangular shape, and the area thereof is larger than the area of the opening of the fuel gas supply manifold 91 (fuel gas supply manifold hole 71). The size of the recess 46 of the fuel gas introducing member 61 is designed such that the first member 59 fits in the recess 46. The first member 59 is accommodated in (fits in) the recess 46 such that tip end portions of the leg portions 59A are located at a bottom surface of the recess 46.

A communication portion (herein, a through hole) 60 is formed on the main surface of the base portion 59B so as not to overlap the gas lead-out port 44 when viewed from the thickness direction of the polymer electrolyte membrane 1 in a state where the first member 59 is accommodated in (fits in) the recess 46. More specifically, the communication portion 60 is provided in a region other than a region 32 of the fuel gas supply manifold 91, the region 32 being defined by projecting the inlet portion 6A of the first reactant gas channel 6 in an upper direction (vertically upper direction). Specifically, in Embodiment 4, when viewed from the thickness direction of the polymer electrolyte membrane 1, the communication portion 60 is provided between the gas lead-out port 44 and the region 32.

A portion, other than the communication portion 60, of the main surface of the base portion 59B constitutes the water holding portion 49. In Embodiment 4, the communication portion 60 is constituted by the through hole. However, the present embodiment is not limited to this, and the communication portion 60 may be constituted by a cutout. The base portion 59B is configured such that the area of the water holding portion 49 is equal to or larger than one time the area of the opening of the communication portion 60.

The polymer electrolyte fuel cell 100 according to Embodiment 4 configured as above also has the same operational advantages as the polymer electrolyte fuel cell 100 according to Embodiment 1.

Modification Example 1 of Embodiment 4

Next, Modification Example of the polymer electrolyte fuel cell 100 according to Embodiment 4 will be explained in reference to FIG. 10.

The polymer electrolyte fuel cell of Modification Example 1 of Embodiment 4 is configured such that: the inlet portions of the gas channels of the separators are formed such that the reactant gases flow in the horizontal direction; and when viewed from the thickness direction of the polymer electrolyte membrane, the communication portion of the first member is provided in a region other than a region of the manifold, the region of the manifold being defined by extending the inlet portion of the gas channel.

Configuration of Polymer Electrolyte Fuel Cell

Figure 10:
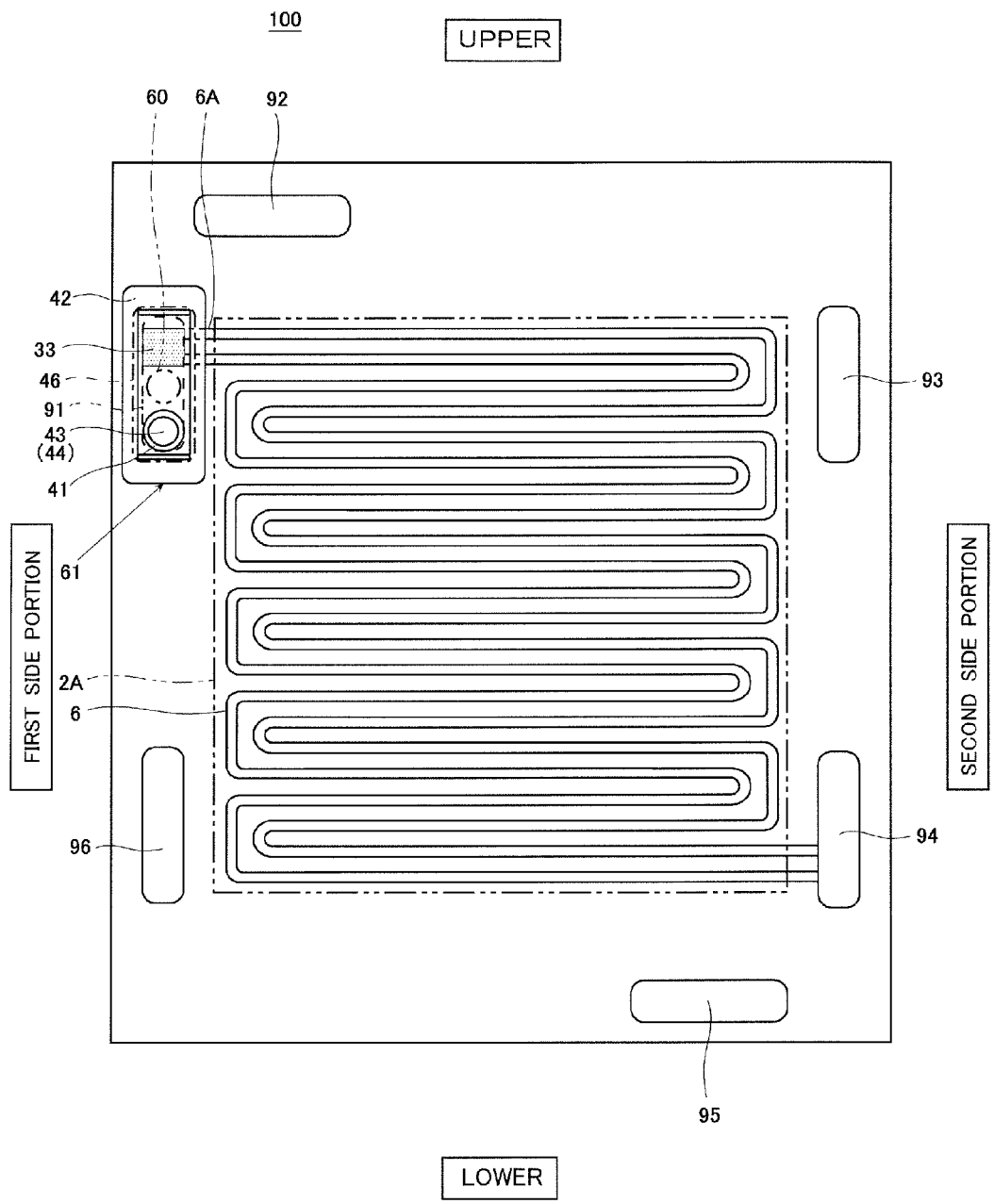
FIG. 10 is a transparent view of the polymer electrolyte fuel cell of Modification Example 1 of Embodiment 4.

FIG. 10 is a transparent view of the polymer electrolyte fuel cell of Modification Example 1 of Embodiment 4 and schematically shows a positional relation among the manifolds, the first member, the gas introducing member, and the like. The upper-lower direction of the polymer electrolyte fuel cell corresponds to the upper-lower direction of FIG. 10. To clearly show respective members in FIG. 10, some members are shown by solid lines, and the oxidizing gas introducing member and the like are omitted.

As shown in FIG. 10, the polymer electrolyte fuel cell 100 of Modification Example 1 of Embodiment 4 is the same in basic configuration as the polymer electrolyte fuel cell 100 of Embodiment 4. However, the polymer electrolyte fuel cell 100 of Modification Example 1 of Embodiment 4 is different from the polymer electrolyte fuel cell 100 of Embodiment 4 regarding the positions of the manifolds, such as the fuel gas supply manifold 91, the direction (position) of the inlet portion 6A of the first reactant gas channel 6, the position of the fuel gas introducing member 61, and the position of the communication portion 60 of the first member 59.

Specifically, the fuel gas supply manifold 91, the cooling medium supply manifold 92, the oxidizing gas supply manifold 93, the fuel gas discharge manifold 94, the cooling medium discharge manifold 95, and the oxidizing gas discharge manifold 96 are formed at the same positions as those of the polymer electrolyte fuel cell 100 of Modification Example 1 of Embodiment 1. The inlet portion 6A of the first reactant gas channel 6 is formed such that the fuel gas flows in the horizontal direction.

The fuel gas introducing member 61 is provided such that when viewed from the thickness direction of the polymer electrolyte membrane 1, the gas lead-out port 44 overlaps the fuel gas supply manifold 91. Specifically, the fuel gas introducing member 61 is provided at a position outside and under the cooling medium supply manifold 92.

The communication portion 60 of the first member 59 is provided in a region other than a region 33 of the fuel gas supply manifold 91, the region 33 being defined by extending the inlet portion 6A of the first reactant gas channel 6. Specifically, in Embodiment 4, when viewed from the thickness direction of the polymer electrolyte membrane 1, the communication portion 60 is provided between the gas lead-out port 44 and the region 33.

The polymer electrolyte fuel cell 100 of Modification Example 1 configured as above also has the same operational advantages as the polymer electrolyte fuel cell 100 of Embodiment 4.

Embodiment 5

The polymer electrolyte fuel cell according to Embodiment 5 is configured such that the first member is the plate member.

Configuration of Polymer Electrolyte Fuel Cell

Figure 11:
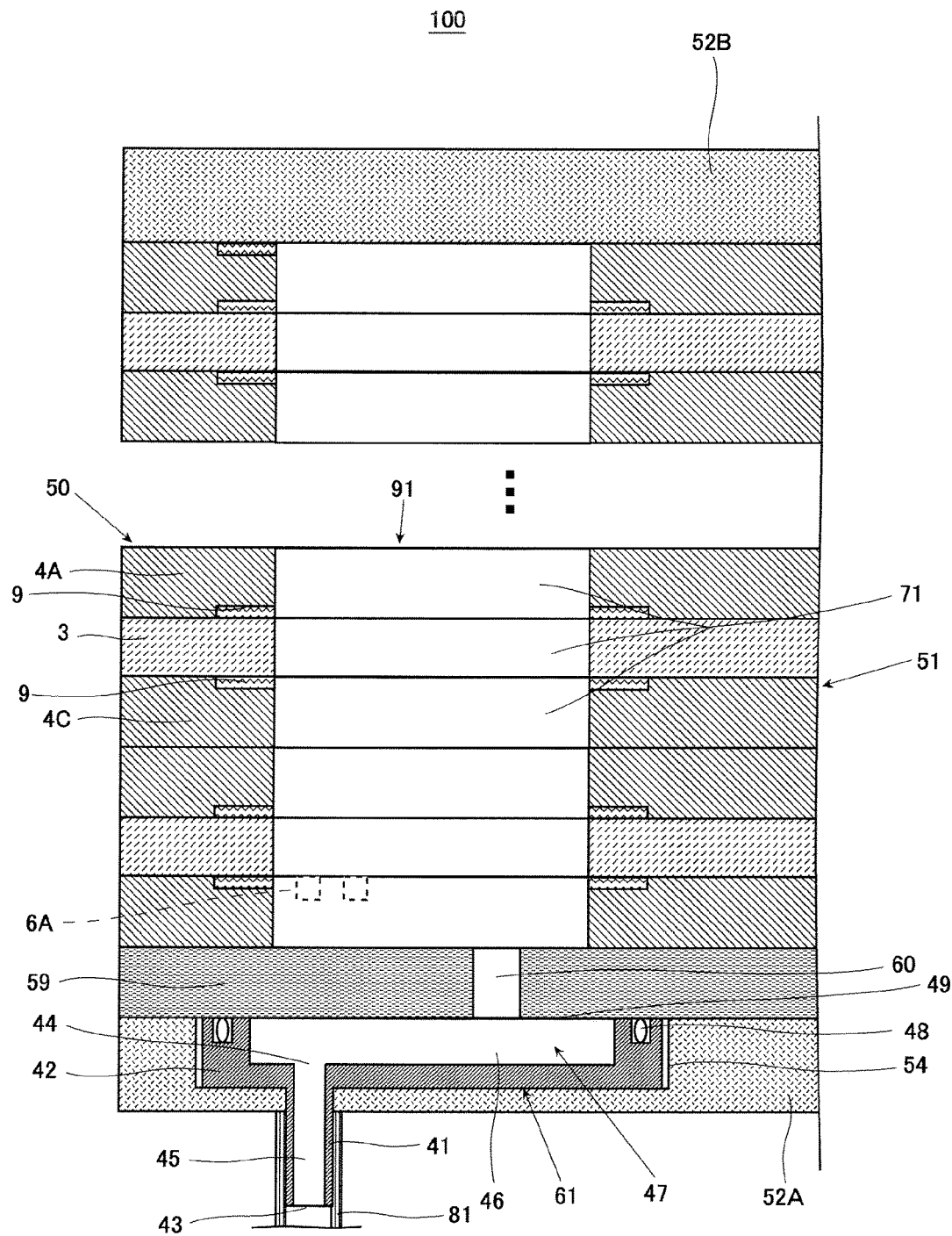
FIG. 11 is a cross-sectional view schematically showing a schematic configuration of the polymer electrolyte fuel cell according to Embodiment 5.

FIG. 11 is a cross-sectional view schematically showing a schematic configuration of the polymer electrolyte fuel cell according to Embodiment 5. A part of the polymer electrolyte fuel cell is omitted from FIG. 11.

As shown in FIG. 11, the polymer electrolyte fuel cell 100 according to Embodiment 5 is the same in basic configuration as the polymer electrolyte fuel cell 100 according to Embodiment 4. However, the polymer electrolyte fuel cell 100 according to Embodiment 5 is different from the polymer electrolyte fuel cell 100 according to Embodiment 4 in that the first member 59 is the plate member. As with Embodiment 3, the plate member constituting the first member 59 may be constituted by an insulating plate.

The fuel gas introducing member 61 is provided such that the inner surface of the base portion 42 contacts one (hereinafter referred to as an "outer surface") of main surfaces of the first member 59, the one main surface not contacting the second separator 4C. In Embodiment 5, the second gas passage 47 is constituted by the recess 46 and the outer surface of the first member 59, and a portion, forming the second gas passage 47, of the outer surface of the first member 59 constitutes the water holding portion 49.

The polymer electrolyte fuel cell 100 according to Embodiment 5 configured as above also has the same operational advantages as the polymer electrolyte fuel cell 100 according to Embodiment 4.

In Embodiment 5, the first member 59 having a plate shape is provided between the end plate 52A and the cell stack body 51. However, the present embodiment is not limited to this. For example, as with the polymer electrolyte fuel cell 100 according to Embodiment 2, the fuel gas introducing member 61 may be provided on the outer surface of the end plate 52A. In this case, the end plate 52A constitutes the first member.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

According to the polymer electrolyte fuel cell of the present invention, both the prevention of the abnormal voltage reduction caused by the clogging of the gas channel by the condensed water in the reactant gas and the improvement of the mass productivity of the fuel cell can be realized by a simple configuration. Therefore, the present invention is useful in the filed of fuel cells.

REFERENCE SIGNS LIST 1 polymer electrolyte membrane
2A electrode
2C electrode
3 frame
4A first separator
4C second separator
5 MEA (membrane-electrode assembly)
6 first reactant gas channel
6A inlet portion
7 second reactant gas channel
8 cooling medium channel
9 gasket
30 region
31 region
32 region
33 region
41 tubular portion
42 base portion
43 gas introducing port
44 gas lead-out port
45 first gas passage
46 recess
47 second gas passage
48 O ring
49 water holding portion
50 unit cell
51 cell stack body
52A end plate
52B end plate
53A current collector
53B current collector
54 accommodating portion
55 through hole
56 screw
57A insulating plate
57B insulating plate
58 through hole
59 first member
59A leg portion
59B base portion
60 communication portion
61 fuel gas introducing member
62 cooling medium introducing member
63 oxidizing gas introducing member
71 fuel gas supply manifold hole
81 fuel gas supply pipe
91 fuel gas supply manifold
92 cooling medium supply manifold
93 oxidizing gas supply manifold
94 fuel gas discharge manifold
95 cooling medium discharge manifold
96 oxidizing gas discharge manifold
100 polymer electrolyte fuel cell

The invention claimed is:
1. A polymer electrolyte fuel cell comprising:
a unit cell including a membrane-electrode assembly and a pair of plate-shaped separators provided so as to contact the membrane-electrode assembly, the membrane-electrode assembly including a polymer electro- lyte membrane and a pair of electrodes sandwiching the polymer electrolyte membrane, groove-shaped gas channels through which reactant gases respectively flow being respectively formed on main surfaces of the electrodes or main surfaces of the separators;

manifolds formed so as to respectively communicate with inlet portions of the gas channels;

a gas introducing member including a gas introducing port, a gas lead-out port, and a first gas passage formed such that the gas introducing port and the gas lead-out port communicate with each other;

a first member including a main surface on which a communication portion is formed, wherein:

a recess is formed downstream of the gas lead-out port of the gas introducing member so as to be connected to the gas lead-out port;

the first member is provided such that the communication portion communicates with one of the manifolds;

the gas introducing member is provided such that the recess communicates with the communication portion, and when viewed from a stacking direction of the polymer electrolyte membrane, the gas lead-out port, the main surface of the first member, and the one of the manifolds overlap each other;

a second gas passage is constituted by the recess of the gas introducing member and the main surface of the first member;

the inlet portions of the gas channels of the separators are formed such that the reactant gases flow in a vertical direction;

when viewed from the stacking direction of the polymer electrolyte membrane, the communication portion of the first member is provided in a region other than a region defined by projecting the inlet portion of the gas channel of the separator, where the gas introducing member is provided, in a vertically upper direction; and wherein the gas introducing port, the first gas passage, the gas lead-out port, the recess, the communication portion, and the one of the manifolds are arranged in this order, in the stacking direction of the polymer electrolyte membrane.

2. The polymer electrolyte fuel cell according to claim 1, wherein the first member is accommodated in the recess.

3. The polymer electrolyte fuel cell according to claim 2, wherein:

the first member is formed in a U shape and includes a pair of leg portions and a plate-shaped base portion;

the communication portion is formed on a main surface of the base portion; and the first member is provided such that tip end portions of the leg portions are located at the gas lead-out port side of the gas introducing member.

4. The polymer electrolyte fuel cell according to claim 2, wherein the base portion of the first member is formed such that an area of a water holding portion that is a portion, forming the second gas passage, of the base portion is equal to or larger than one time an area of an opening of the communication portion.

5. The polymer electrolyte fuel cell according to claim 4, wherein:

a gas pipe through which the reactant gas flows is connected to the gas introducing member; and a hydrophilic property of the water holding portion is higher than that of an inner peripheral surface of the gas pipe.

6. The polymer electrolyte fuel cell according to claim 1, wherein the first member is a plate member.

7. The polymer electrolyte fuel cell according to claim 1, wherein the first member and the gas introducing member are formed such that a longitudinal axis of the first gas passage and a longitudinal axis of the second gas passage intersect with each other at a right angle.

8. The polymer electrolyte fuel cell according to claim 1, wherein a hydrophilic property of a water holding portion that is a portion, forming the second gas passage, of the first member is higher than that of a portion of the first member other than the water holding portion.

9. The polymer electrolyte fuel cell according to claim 1, further comprising:

a pair of end plates arranged so as to sandwich the unit cell, wherein at least one of the end plates is provided with a through hole, and the gas introducing member is attached to an outer surface of the at least one of the end plates so as to cover the through hole.

10. The polymer electrolyte fuel cell according to claim 1, further comprising:

a pair of end plates arranged so as to sandwich the unit cell, wherein at least one of the end plates is provided with a stepped through hole, and the gas introducing member is accommodated in the stepped through hole.

11. The polymer electrolyte fuel cell according to claim 1, wherein the communication portion includes a through hole in the first member.

* * * * *